United States Patent
Naito et al.

(10) Patent No.: US 11,427,261 B2
(45) Date of Patent: Aug. 30, 2022

(54) VEHICLE BODY STRUCTURE AND METHOD FOR MANUFACTURING VEHICLE BODY

(71) Applicant: NISSAN MOTOR CO., LTD., Yokohama (JP)

(72) Inventors: Tetsuro Naito, Kanagawa (JP); Toshikazu Torigaki, Kanagawa (JP); Shinichirou Takemoto, Kanagawa (JP); Katsumi Morohoshi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 15/734,684

(22) PCT Filed: Jun. 5, 2018

(86) PCT No.: PCT/JP2018/021436
§ 371 (c)(1),
(2) Date: Dec. 3, 2020

(87) PCT Pub. No.: WO2019/234804
PCT Pub. Date: Dec. 12, 2019

(65) Prior Publication Data
US 2021/0229756 A1 Jul. 29, 2021

(51) Int. Cl.
*B60J 9/00* (2006.01)
*B62D 29/00* (2006.01)
(Continued)

(52) U.S. Cl.
CPC ......... *B62D 29/001* (2013.01); *B62D 25/025* (2013.01); *B62D 65/02* (2013.01)

(58) Field of Classification Search
CPC .. B62D 25/025; B62D 25/04; B62D 25/2036; B62D 21/157; B62D 25/2018; B61D 7/00; E21D 23/0409; Y02P 70/50
See application file for complete search history.

(56) References Cited

U.S. PATENT DOCUMENTS 8,366,185 B2 * 2/2013 Herntier ............... B62D 21/157
296/187.12
8,985,681 B2 * 3/2015 Fujii .................. B62D 25/2036
296/204

(Continued)

FOREIGN PATENT DOCUMENTS

CN 104024093 A 9/2014
DE 102006052643 A1 4/2008
(Continued)

*Primary Examiner* — Kiran B Patel
(74) *Attorney, Agent, or Firm* — Foley & Lardner LLP (57) ABSTRACT

A vehicle body structure includes a resin floor part provided with a flange portion bent toward an upper side or a lower side at an end in a vehicle width direction, and a metal side sill part joined to the flange portion of the floor part. The side sill part includes a rim portion, a peak portion, and intermediate portions that link the rim portion to the peak portion. The peak portion and the intermediate portions form a protruding portion projecting from the rim portion toward the floor part. The flange portion of the floor part is joined to the peak portion of the protruding portion.

11 Claims, 8 Drawing Sheets

(51) Int. Cl.
   *B62D 25/02* (2006.01)
   *B62D 65/02* (2006.01)

(56) References Cited

U.S. PATENT DOCUMENTS

| | | | |
|---|---|---|---|
| 9,139,234 B2 * | 9/2015 | Mori | B62D 25/025 |
| 9,205,876 B2 | 12/2015 | Goto | |
| 9,981,699 B2 * | 5/2018 | Ayuzawa | B32B 3/26 |
| 2013/0242487 A1 | 9/2013 | Fujioka et al. | |
| 2014/0367996 A1 | 12/2014 | Goto | |
| 2016/0016359 A1 | 1/2016 | Kondo et al. | |
| 2016/0221609 A1 | 8/2016 | Furusaki et al. | |
| 2016/0272248 A1 | 9/2016 | Furusaki et al. | |
| 2017/0011730 A1 | 1/2017 | Seto et al. | |

FOREIGN PATENT DOCUMENTS

| | | |
|---|---|---|
| JP | 60-38874 U | 3/1985 |
| JP | 62-102778 U | 6/1987 |
| JP | 62-175269 A | 7/1987 |
| JP | 64-22681 A | 1/1989 |
| JP | 7-132860 A | 5/1995 |
| JP | 7-277228 A | 10/1995 |
| JP | 2008-068720 A | 3/2008 |
| JP | 2009-190696 A | 8/2009 |
| JP | 2012-111247 A | 6/2012 |
| JP | 2012-206504 A | 10/2012 |
| JP | 2013-163465 A | 8/2013 |
| WO | WO 2014/142189 A1 | 9/2014 |
| WO | WO 2015/115647 A1 | 8/2015 |

\* cited by examiner

VEHICLE BODY STRUCTURE AND METHOD FOR MANUFACTURING VEHICLE BODY

TECHNICAL FIELD

The present invention relates to a vehicle body structure in which a floor part is joined to a side sill part, and to a method for manufacturing a vehicle body.

BACKGROUND ART

A technique disclosed in Patent Literature 1 has been known as a structure to join a floor panel to a side sill. In the structure according to Patent Literature 1, both the floor panel and the side sill are formed from metal parts and are joined to each other by welding.

CITATION LIST

Patent Literature

Patent Literature 1: Japanese Patent Application Publication No. 2013-163465

SUMMARY OF INVENTION

Technical Problem

The structure according to Patent Literature 1 involves the joining of the metal parts and can therefore employ the welding method. Meanwhile, it is not possible to employ the joining method by means of welding when a portion of the floor panel to be joined to the side sill is formed from a resin. For this reason, in order to join the side sill made of a metal to the floor panel made of a resin, it is necessary to improve rigidity around a junction by further increasing a junction area.

In view of the above, an object of the present invention is to improve rigidity around a junction by further increasing a junction area between a side sill part made of a metal and a floor part made of a resin.

Solution to Problem

In a vehicle body structure according to an aspect of the present invention, a resin floor part includes a flange portion that is formed to be bent toward an upper side or a lower side at an end in a vehicle width direction, and a metal side sill part includes a protruding portion that projects from a rim portion toward the floor part. The flange portion of the floor part is joined to a peak portion of the protruding portion of the side sill part.

ADVANTAGEOUS EFFECTS OF INVENTION

According to the present invention, it is possible to improve rigidity around a junction by further increasing a junction area between a side sill part made of a metal and a floor part made of a resin.

DESCRIPTION OF EMBODIMENTS

Embodiments of the present invention will be described below with reference to the drawings.

First Embodiment

Figure 1:
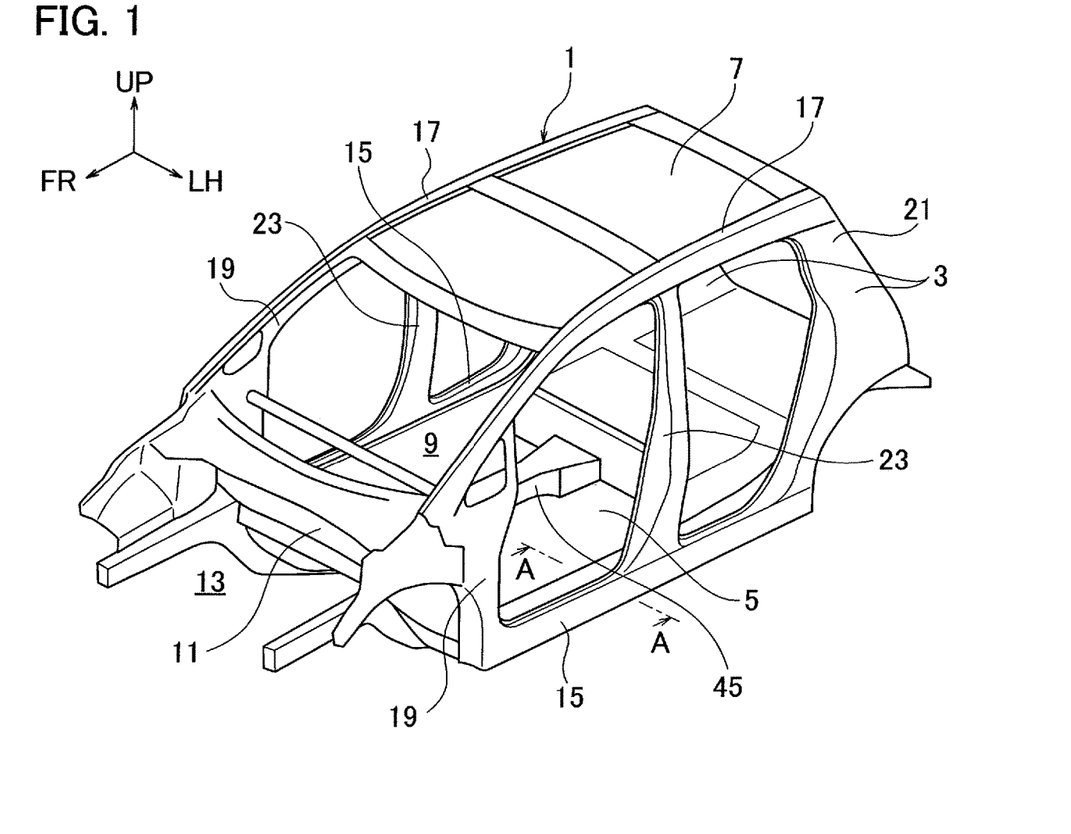
FIG. 1 is a perspective view showing a vehicle body structure according to a first embodiment.

A vehicle body structure according to a first embodiment will be described with reference to FIG. 1. FIG. 1 shows a vehicle body structure of an automobile. In FIG. 1, a direction indicated with an arrow FR represents a front side of a vehicle body, a direction indicated with an arrow UP represents an upper side of the vehicle body, and a direction indicated with an arrow LH represents a left side of the vehicle body.

A vehicle body 1 includes right and left body side panels 3, a floor panel 5, and a roof panel 7. A vehicle interior 9 is formed inside surrounded by these panels 3, 5, and 7. A motor (engine) room 13 is formed in front of the vehicle interior 9 while interposing a dash panel 11 in between. Each body side panel 3 includes a side sill 15 located at a lower part of the vehicle body, a roof side rail 17 located at an upper part of the vehicle body, a front pillar 19 located at a front part of the vehicle body, a rear pillar 21 located at a rear part of the vehicle body, and a center pillar 23 located at the center in a vehicle body front-rear direction.

The side sill 15 and the roof side rail 17 extend in the vehicle body front-rear direction. The front pillar 19, the rear pillar 21, and the center pillar 23 extend in a vehicle body up-down direction. The front pillar 19 connects front ends of the side sill 15 and of the roof side rail 17 to each other, the rear pillar 21 connects rear ends thereof to each other, and the center pillar 23 connects central parts thereof to each other, respectively. The side sill 15 is joined and fixed to the floor panel 5 and the roof side rail 17 is joined and fixed to the roof panel 7.

Figure 2:
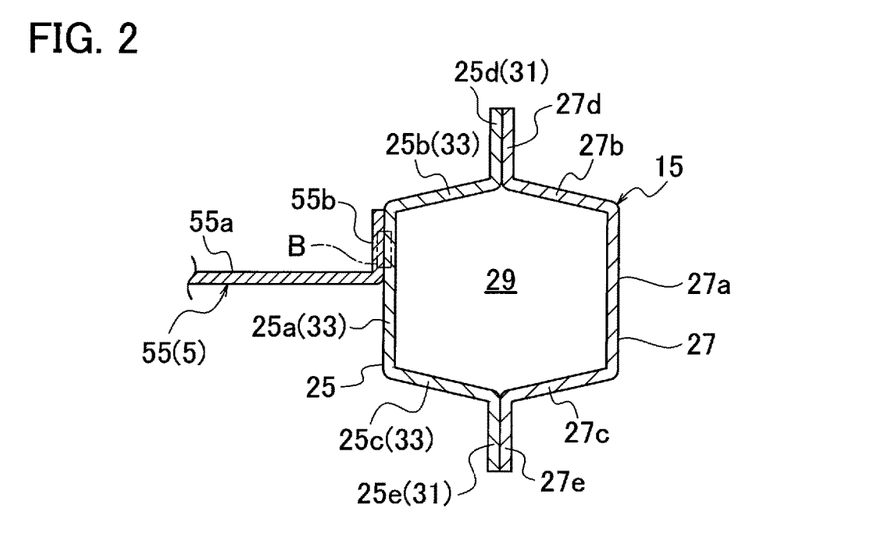
FIG. 2 is a cross-sectional view taken along the A-A line in FIG. 1.

As shown in FIG. 2 that represents a cross-sectional view taken along the A-A line in FIG. 1, the side sill 15 includes a side sill inner member 25 serving as a side sill part and a side sill outer member 27 serving as a second side sill part, each of which is molded by pressing a metal panel material formed from a steel plate, aluminum, or the like. The side sill inner member 25 is located on an inner side in a vehicle width direction of the side sill outer member 27 while the side sill outer member 27 is located on an outer side in the vehicle width direction of the side sill inner member 25.

The side sill inner member 25 includes a side wall 25$a$ as a peak portion that extends in an up-down direction, an upper wall 25$b$ as an upper surface portion that is bent slightly obliquely upward on an outer side in the vehicle width direction from an upper end of the side wall 25$a$, and a lower wall 25$c$ as a lower surface portion that is bent slightly obliquely downward on the outer side in the vehicle width direction from a lower end of the side wall 25$a$. An end of the upper wall 25$b$ on an opposite side of the side wall 25$a$ forms an upper flange 25$d$ that is bent upward and an end of the lower wall 25$c$ on an opposite side of the side wall 25$a$ forms a lower flange 25$e$ that is bent downward.

The side sill outer member 27 includes a side wall 27$a$ that extends in the up-down direction, an upper wall 27$b$ that is bent slightly obliquely upward on an inner side in the vehicle width direction from an upper end of the side wall 27$a$, and a lower wall 27$c$ that is bent slightly obliquely downward on the inner side in the vehicle width direction from a lower end of the side wall 27$a$. An end of the upper wall 27$b$ on an opposite side of the side wall 27$a$ forms an upper flange 27$d$ that is bent upward and an end of the lower wall 27$c$ on an opposite side of the side wall 27$a$ forms a lower flange 27$e$ that is bent downward. The upper flanges 25$d$ and 27$d$ are joined and fixed to each other by welding and the lower flanges 25$e$ and 27$e$ are joined and fixed to each other by welding, thus forming the side sill 15. A closed cross-sectional portion 29 is formed inside the side sill 15.

The floor panel 5 includes a floor panel side portion 55 as a floor part to be joined to the side sill 15. The floor panel side portion 55 is a composite material formed by mixing a fiber-reinforcement material such as carbon fibers with a thermoplastic resin such as polyamide, for example. The floor panel side portion 55 does not always have to contain the fiber-reinforcement material. The floor panel side portion 55 includes a bottom wall 55$a$ formed into a substantially horizontal surface, and a flange portion 55$b$ formed to be bent toward an upper side at an angle of about 90° from an end in the vehicle width direction of the bottom wall 55$a$.

The flange portion 55$b$ is attached to an upper part of the side wall 25$a$ of the side sill inner member 25. When the floor panel side portion 55 is molded integrally with the side sill inner member 25, the flange portion 55$b$ is joined and attached closely to the side wall 25$a$ of the side sill 15. Here, without limitation to the upper part of the side wall 25$a$, the flange portion 55$b$ may be attached to the center or a lower part in the up-down direction of the side wall 25$a$, or to the entire side wall 25$a$. The flange portion 55$b$ may be bent toward a lower side from the bottom wall 55$a$. In other words, the side sill inner member 25 includes the flange portion which is formed to be bent toward the upper side or the lower side at an end in the vehicle width direction.

In the side sill inner member 25, the upper flange 25$d$ and the lower flange 25$e$ constitute a rim portion 31, and a protruding portion 33 is formed to project from the rim portion 31 toward the floor panel side portion 55. The protruding portion 33 is formed from the side wall 25$a$, the upper wall 25$b$, and the lower wall 25$c$. The upper wall 25$b$ and the lower wall 25$c$ form an intermediate portion that links the rim portion 31 to the peak portion 25$a$.

This embodiment includes the floor panel side portion 55 made of a resin and provided with the flange portion 55$b$ that is bent toward the upper side or the lower side at the end in the vehicle width direction, and the side sill inner member 25 made of a metal and joined to the floor panel side portion 55 made of the resin at the flange portion 55$b$. The side sill inner member 25 includes the rim portion 31, the peak portion 25$a$, and the upper wall 25$b$ as well as the lower wall 25$c$ which link the rim portion 31 to the peak portion 25$a$. The peak portion 25$a$, the upper wall 25$b$, and the lower wall 25$c$ form the protruding portion 33 that projects from the rim portion 31 toward the floor panel side portion 55. The flange portion 55$b$ of the floor panel side portion 55 is joined to the side wall 25$a$ of the protruding portion 33.

In this case, the flange portion 55$b$ of the floor panel side portion 55 is joined in such a way as to butt against the side wall 25$a$ of the protruding portion 33 of the side sill inner member 25. The flange portion 55$b$ makes it possible to secure a larger junction area between the floor panel side portion 55 and the side sill inner member 25 and junction strength is thus improved.

When the flange portion 55$b$ joined and fixed to the side sill inner member 25 is used as part of the side sill 15, a thickness in the vehicle width direction of the side sill 15 becomes larger in an amount equivalent to an additional thickness of the flange portion 55$b$ whereby a cross-sectional shape of the side sill 15 is increased. This makes it possible to improve rigidity of the side sill 15 being a region around a junction of the side sill inner member 25 and the floor panel side portion 55. As a consequence of the increase in thickness in the vehicle width direction of the side sill 15, rigidity against a load from a lateral side of the vehicle (hereinafter referred to as a lateral collision load) is particularly improved.

Second Embodiment

Figure 3:
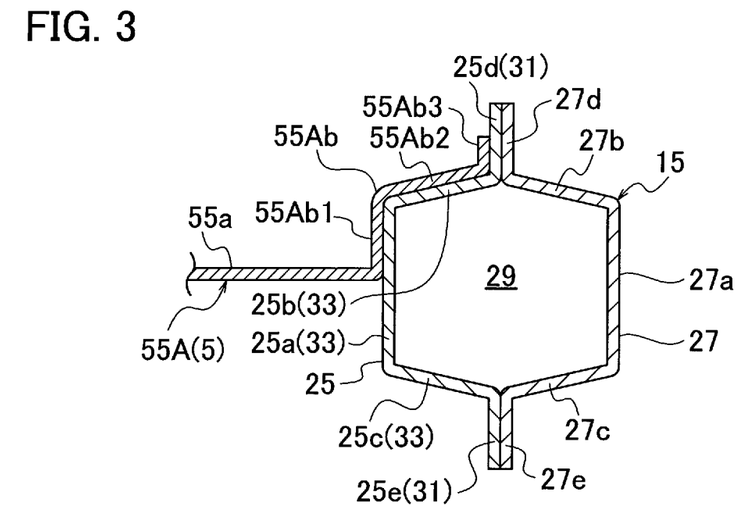
FIG. 3 is a cross-sectional view corresponding to FIG. 2, which shows a second embodiment.

FIG. 3 shows a vehicle body structure according to a second embodiment. In the second embodiment, a shape of a floor panel side portion 55A is different from that of the first embodiment. The side sill 15 is the same as that of the first embodiment. As with the floor panel side portion 55 of the first embodiment, the floor panel side portion 55A includes the bottom wall 55$a$ and a flange portion 55A$b$.

The flange portion 55A$b$ includes a floor side wall 55A$b$1 formed to be bent toward the upper side at an angle of about 90° from an end in the vehicle width direction of the bottom wall 55$a$. The flange portion 55A$b$ further includes a floor upper wall 55A$b$2 that is bent and extends slightly obliquely upward on the outer side in the vehicle width direction from an upper end of the floor side wall 55A$b$1, and a floor end wall 55A$b$3 that is bent and extends upward from an end of the floor upper wall 55A$b$2 on an opposite side of the floor side wall 55A$b$1.

The floor side wall 55A$b$1 is joined to an upper part of the side wall 25$a$ of the side sill inner member 25. The floor upper wall 55A$b$2 is lapped over and joined to the upper wall 25*b* of the protruding portion 33. The floor end wall 55Ab3 is joined to the upper flange 25*d*. As with the floor panel side portion 55 in FIG. 2, the floor panel side portion 55A is molded from a resin-containing material integrally with the side sill inner member 25. Here, the floor end wall 55Ab3 is dispensable.

According to the second embodiment, the intermediate portion that links the rim portion 31 to the peak portion 25*a* is formed from the upper wall 25*b* at the upper part of the vehicle body and the lower wall 25*c* at the lower part of the vehicle body. The flange portion 55Ab is formed to be bent toward the upper side, and the floor upper wall 55Ab2 is joined to the upper wall 25*b*. In this case, the floor upper wall 55Ab2 and the floor end wall 55Ab3 that are formed in conformity to the shape of the side sill inner member 25 are joined to the upper wall 25*b* and the upper flange 25*d*, respectively. Thus, the junction area is further expanded and the junction strength is further improved. The rigidity against a lateral collision load is improved as well. Due to the state of placing the floor upper wall 55Ab2 on the upper wall 25*b* of the side sill inner member 25, a binding force in the up-down direction between the side sill inner member 25 and the floor panel side portion 55A is increased.

Third Embodiment

Figure 4:
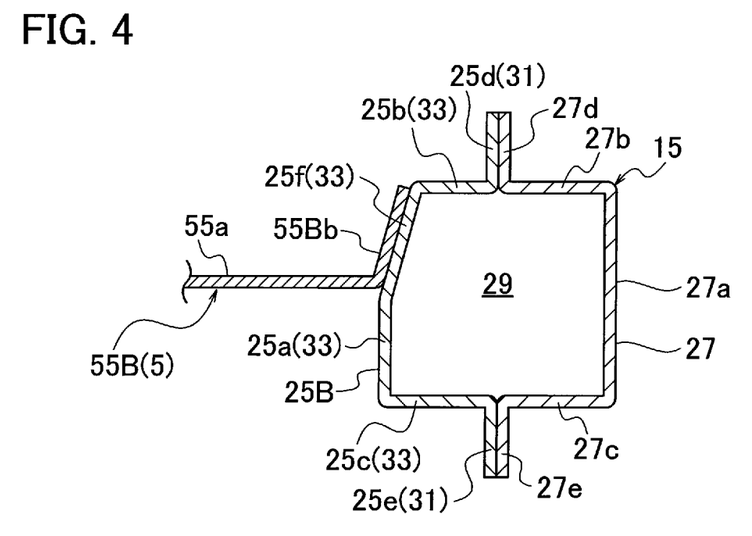
FIG. 4 is a cross-sectional view corresponding to FIG. 2, which shows a third embodiment.

FIG. 4 shows a vehicle body structure according to a third embodiment. In the third embodiment, a shape of a side sill inner member 25B is different from that of the first embodiment. In the side sill inner member 25B, an inclined wall 25*f* is provided to an upper part of the side wall 25*a*. The inclined wall 25*f* is inclined such that its upper part is located on the outer side in the vehicle width direction (the right side in FIG. 4) as compared to its lower side. A flange portion 55Bb of a floor panel side portion 55B is inclined such that its upper part is located on the outer side in the vehicle width direction as compared to its lower side so as to correspond to the inclined wall 25*f*.

As with the floor panel side portion 55 in FIG. 2, the floor panel side portion 55B is molded from a resin-containing material integrally with the side sill inner member 25B. The upper wall 25*b* and the lower wall 25*c* of the side sill inner member 25B, and the upper wall 27*b* and the lower wall 27*c* of the side sill outer member 27 shown in FIG. 4 are set horizontal, respectively. Instead, any of these walls may be inclined like the side sill inner member 25 in FIG. 2. In the floor panel side portion 55B of FIG. 4, the flange portion 55Bb may include a floor upper wall and a floor end wall like the floor upper wall 55Ab2 and the floor end wall 55Ab3 of the floor panel side portion 55A in FIG. 3.

According to the third embodiment, the side wall 25*a* to be joined to the flange portion 55Bb includes the inclined wall 25*f* that is inclined relative to a vertical direction. In this case, when a pressure in the up-down direction in FIG. 4 is applied to the resin supplied into molds, a pressure in the up-down direction is more likely to act in the joining direction between the flange portion 55*b* and the inclined wall 25*f*. As a consequence, the junction strength between the floor panel side portion 55 and the side sill inner member 25 is further improved. Since the inclined wall 25*f* is formed by inclining part of the side wall 25*a* toward the outer side in the vehicle width direction, a space in the vehicle interior 9 becomes larger as compared to FIGS. 2 and 3.

Fourth Embodiment

Figure 5:
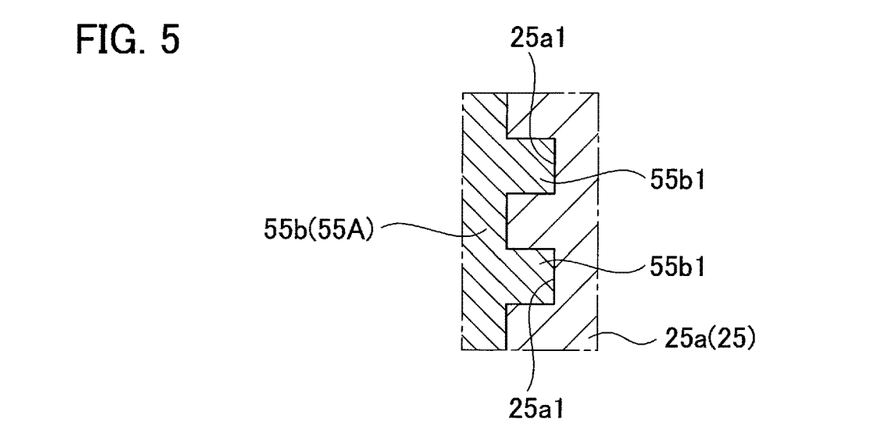
FIG. 5 is an enlarged cross-sectional view of part B in FIG. 2, which shows a fourth embodiment.

FIG. 5 shows a fourth embodiment. FIG. 5 is an enlarged cross-sectional view of part B in FIG. 2, for example, in which dents 25*a*1 are formed in a surface on the floor panel side portion 55A side of the side wall 25*a* of a side sill inner member 25A. In this way, the surface on the floor panel side portion 55A side of the side wall 25*a* is formed into an indented surface. A resin-containing material enters the dents 25*a*1 at the time of integrally molding the floor panel side portion 55A, whereby resin bulges 55*b*1 are formed on the flange portion 55*b*. For example, the indented surface of the side wall 25*a* can be processed by a waterjet treatment, a chemical conversion treatment, a laser beam treatment, a thermal spray treatment, and the like.

According to the fourth embodiment, an indented structure that is smaller than the protruding portion 33 is formed on the surface of the side sill inner member 25 to be joined to the floor panel side portion 55A. As a consequence, the junction area between the side sill inner member 25 and the floor panel side portion 55A is further increased and the junction strength is further improved.

Fifth Embodiment

Figure 6:
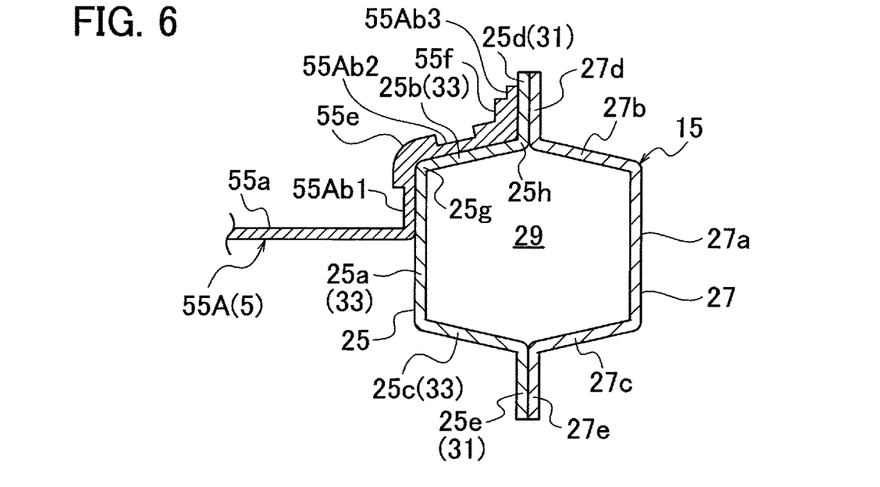
FIG. 6 is a cross-sectional view corresponding to FIG. 2, which shows a fifth embodiment.

FIG. 6 shows a vehicle body structure according to a fifth embodiment. In the fifth embodiment, a plate thickness of the floor panel side portion 55A is changed in contrast to the second embodiment shown in FIG. 3. Specifically, in the floor panel side portion 55A, thickened portions 55*e* and 55*f* are formed by making the plate thickness of portions to be joined to corner portions 25*g* and 25*h* of the side sill inner member 25 greater than the plate thickness of the remaining portions. The corner portion 25*g* is a boundary portion between the side wall 25*a* and the upper wall 25*b* while the corner portion 25*h* is a boundary portion between the upper wall 25*b* and the upper flange 25*d*.

According to the fifth embodiment, the plate thickness of the portions of the floor panel side portion 55A to be joined to the corner portions 25*g* and 25*h* of the side sill inner member 25 is greater than the plate thickness of portions of the floor panel side portion 55A to be joined to a flat portion inclusive of the side wall 25*a* and the upper wall 25*b* of the side sill inner member 25. As a consequence, the bent shape of each of the corner portions 25*g* and 25*h* is less likely to be deformed in case of receiving a lateral collision load, for example. Thus, this configuration can contribute to an improvement in rigidity.

Sixth Embodiment

Figure 7:
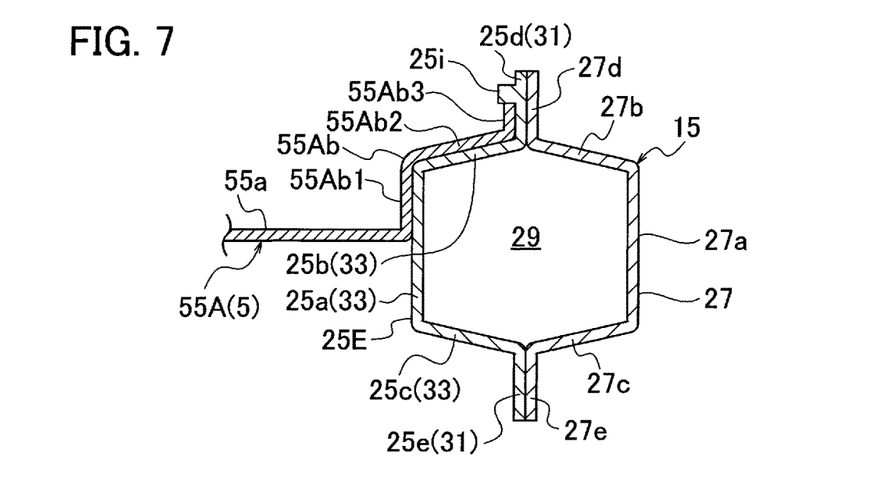
FIG. 7 is a cross-sectional view corresponding to FIG. 2, which shows a sixth embodiment.

FIG. 7 shows a vehicle body structure according to a sixth embodiment. In the sixth embodiment, a projection 25*i* that projects toward the inner side in the vehicle width direction (the left side in FIG. 7) is formed on the upper flange 25*d* of a side sill inner member 25E in contrast to the second embodiment shown in FIG. 3. The projection 25*i* is formed at a position distant upward from the upper wall 25*b*. The projection 25*i* may be provided as a separate member from the side sill inner member 25E and fixed thereto by welding or the like, or may be formed integrally with the side sill inner member 25E by press molding. The floor panel side portion 55A is the same as that shown in FIG. 3, and the floor end wall 55Ab3 is formed between the projection 25*i* and the upper wall 25*b*.

The side sill inner member 25E according to the sixth embodiment includes the projection 25*i* which is smaller than the protruding portion 33 and projects from the upper flange 25*d* toward the floor panel side portion 55A at a position above the upper wall 25*b*. The end in the vehicle width direction of the flange portion 55Ab is located closer to the protruding portion 33 than the projection 25*i* is. In this case, the floor panel side portion 55A is fixed such that the floor upper wall 55Ab2 and the floor end wall 55Ab3 are sandwiched in the up-down direction between the upper wall 25*b* and the projection 25*i* of the side sill inner member 25E. As a consequence, the junction strength between the side sill inner member 25E and the floor panel side portion 55A is improved.

Seventh Embodiment

Figure 8:
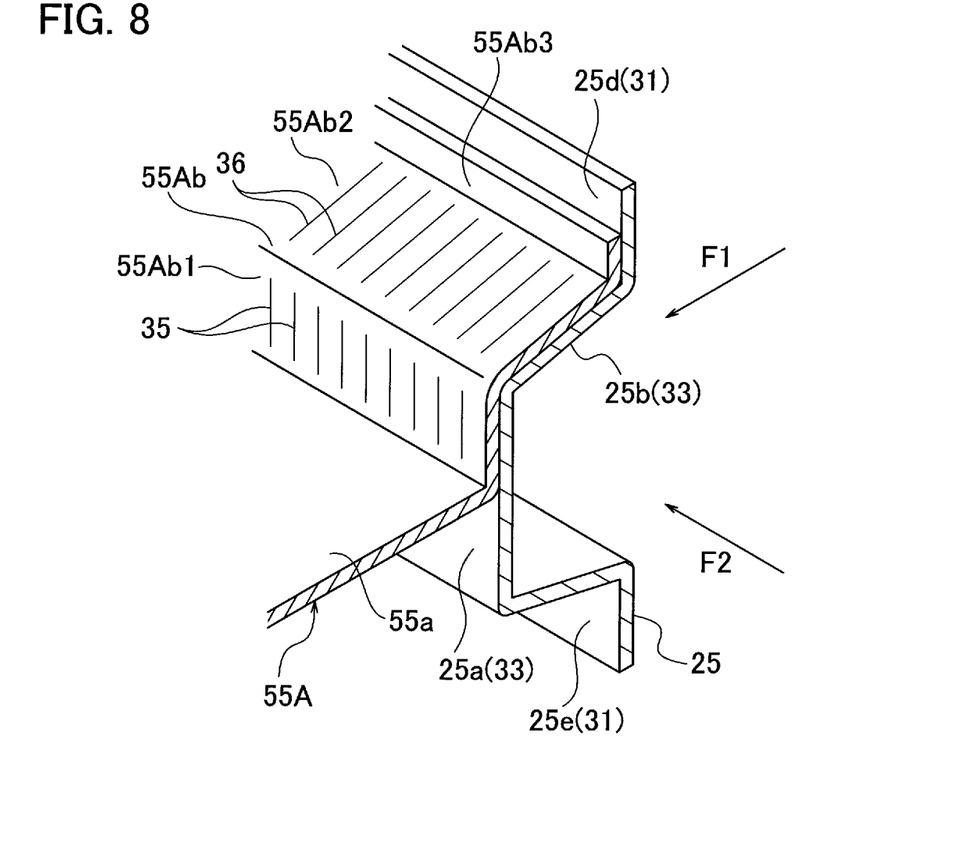
FIG. 8 is a perspective view showing orientations of fiber-reinforcement materials at a floor panel side portion of a seventh embodiment.

FIG. 8 shows a seventh embodiment. In the seventh embodiment, orientations of fiber-reinforcement materials 35 and 36 such as a resin impregnated with carbon fibers are kept constant in the floor panel side portion 55A of the second embodiment shown in FIG. 3, for example. Specifically, in the floor side wall 55Ab1 of the flange portion 55Ab, the fiber-reinforcement material 35 is oriented substantially parallel to a surface of the floor side wall 55Ab1 and along the vertical direction (the vehicle body up-down direction). In the floor upper wall 55Ab2 of the flange portion 55Ab, the fiber-reinforcement material 36 is oriented substantially parallel to a surface of the floor upper wall 55Ab2 and along the vehicle width direction. The fiber-reinforcement material 35 and the fiber-reinforcement material 36 may be lined to each other. Note that fiber-reinforcement materials on the bottom wall 55*a* and the floor end wall 55Ab3 as well as the side sill outer member 27 are omitted in FIG. 8.

As described above, each of the fiber-reinforcement materials 35 and 36 is oriented to a constant direction on a single plane and is orthogonal to the vehicle body front-rear direction in a crossing manner. In this case, when the side sill inner member 25 develops a deformation load in such a way as to be bent along the up-down direction as the vehicle body receives a lateral collision load F1, for example, the fiber-reinforcement materials 35 and 36 with their longitudinal directions being orthogonal to the vehicle body front-rear direction counteract this load and secure rigidity.

When the respective orientations of the respective fiber-reinforcement materials 35 and 36 are set constant, the fiber-reinforcement materials 35 and 36 may be oriented to the vehicle body front-rear direction on the floor side wall 55Ab1 and the floor upper wall 55Ab2, respectively. In this case, when the side sill inner member 25 develops a deformation load in such a way as to be bent along the vehicle body front-rear direction as the vehicle body receives a collision load F2 in the front-rear direction, for example, the fiber-reinforcement materials with their longitudinal directions being in line with the vehicle body front-rear direction counteract this load and secure rigidity.

Here, in the case of orienting each of the fiber-reinforcement materials in the constant direction, the direction is not limited only to the direction orthogonal to the vehicle body front-rear direction or to the vehicle body front-rear direction as mentioned above. For example, the direction may be a direction inclined from the vehicle body front-rear direction.

The resin floor panel side portion 55A according to the seventh embodiment further includes the fiber-reinforcement materials 35 and 36 each oriented to the constant direction on the single plane. As a consequence, rigidity is secured by the fiber-reinforcement materials 35 and 36 when the side sill 15 receives the collision load, and the deformation is thus suppressed.

Eighth Embodiment

Figure 9:
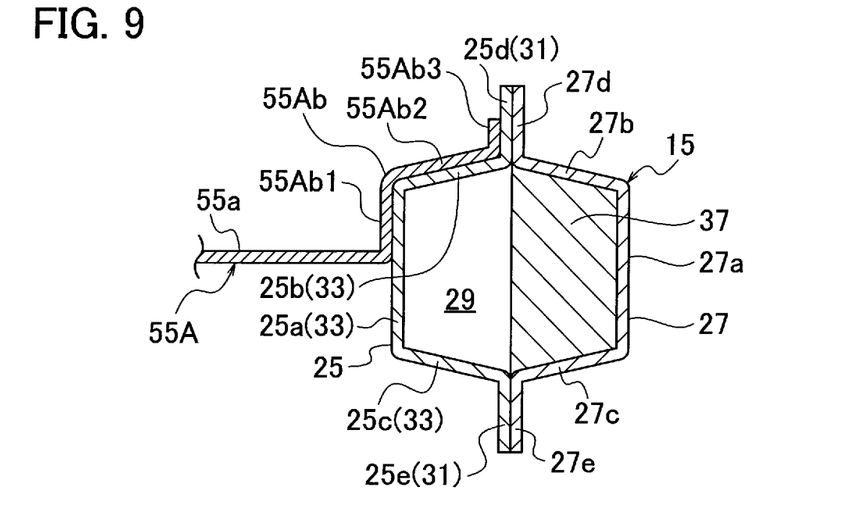
FIG. 9 is a cross-sectional view corresponding to FIG. 2, which shows an eighth embodiment.

FIG. 9 shows an eighth embodiment. In the eighth embodiment, ribs 37 serving as resin members are molded integrally with the side sill outer member 27 at a region opposed to the protruding portion 33 of the side sill inner member 25 in the structure including the floor panel side portion 55A of the second embodiment shown in FIG. 3, for example. The ribs 37 are in close contact with inner surfaces of the side wall 27*a*, the upper wall 27*b*, and the lower wall 27*c* of the side sill outer member 27, respectively. The ribs 37 have a constant plate thickness in a direction orthogonal to the sheet surface in FIG. 9, and are provided at intervals in the direction orthogonal to the sheet surface in FIG. 9.

The side sill inner member 25 integrally provided with the floor panel side portion 55A and the side sill outer member 27 integrally provided with the ribs 37 are joined by welding the upper flanges 25*d* and 27*d* to each other and welding the lower flanges 25*e* and 27*e* to each other, respectively. Thus, the floor panel side portion 55A and the side sill 15 are integrated together. Here, the resin material that forms the ribs 37 may be the same as the resin that forms the floor panel side portion 55A or may be a different material therefrom.

The eighth embodiment includes the side sill outer member 27 joined to a different side in the vehicle width direction from the floor panel side portion 55A of the side sill inner member 25 and configured to form the closed cross-sectional portion 29 in conjunction with the side sill inner member 25, and further includes the ribs 37 disposed at regions of the side sill outer member 27 which are opposed to the protruding portion 33. As a consequence, the side sill outer member 27 is reinforced by the ribs 37 and rigidity of the side sill outer member 27 is thus improved. In this case, together with the reinforcement brought about by joining the floor panel side portion 55A to the protruding portion 33, the higher rigidity of the side sill inner member 25 is secured especially against a lateral collision load.

Ninth Embodiment

Next, a method for manufacturing a vehicle body in a case of molding the floor panel side portion 55B integrally with the side sill inner member 25B shown in FIG. 4, for instance, will be described as a ninth embodiment.

Figure 10:
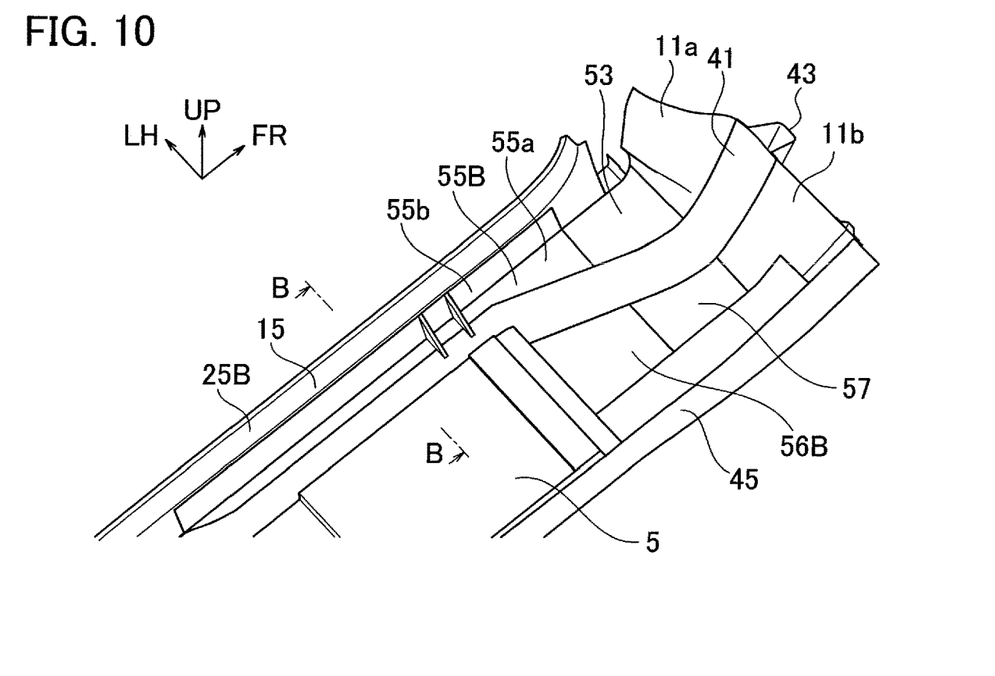
FIG. 10 is a perspective view showing a region around a side sill on a left side in a vehicle width direction in the vehicle body structure of FIG. 1.
Figure 11:
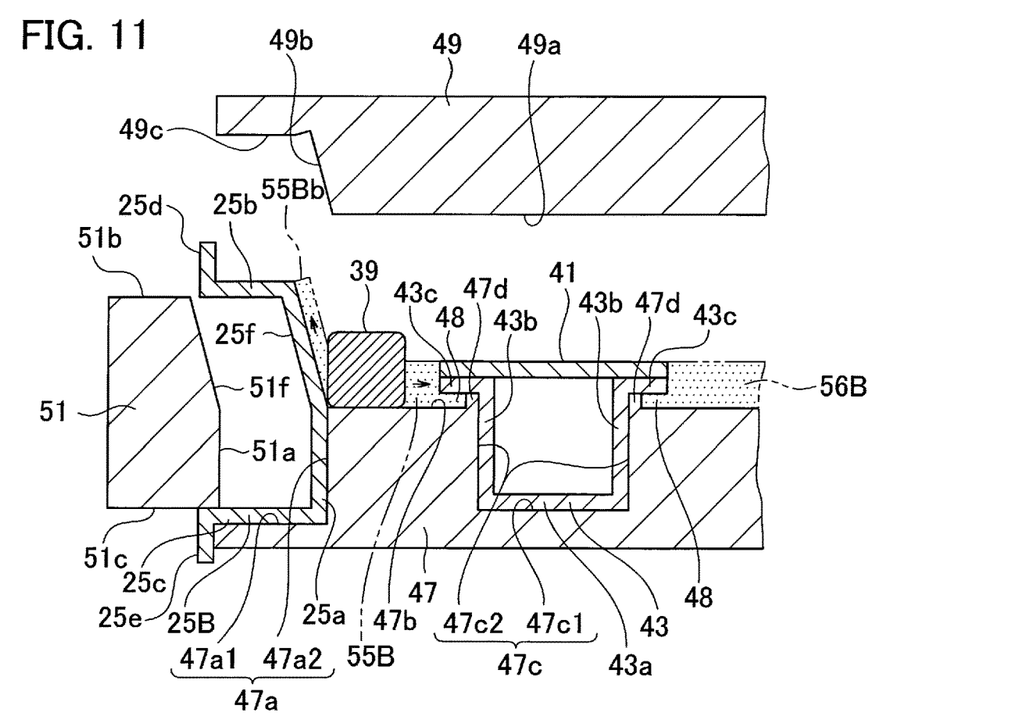
FIG. 11 is a cross-sectional view before molding according to a ninth embodiment showing a portion corresponding to a B-B cross-sectional structure in FIG. 10 inclusive of molds.

FIG. 10 is shows a region around the side sill 15 on the left side in the vehicle width direction, in which the vehicle width direction is reverse to that in FIG. 1. FIG. 11 is a cross-sectional view of a portion in the middle of molding, which corresponds to a B-B cross-sectional structure in FIG. 10 inclusive of molds. FIG. 11 illustrates a resin piece 39 in a solid state to be put in before molding in order to form the floor panel side portion 55B. The resin piece 39 is a composite material prepared by mixing a fiber-reinforcement material such as carbon fibers with a thermoplastic resin such as polyimide. The resin piece 39 corresponds to the resin-containing material.

As shown in FIGS. 10 and 11, a panel material 41 made of a metal as with the side sill inner member 25B, and a reinforcement material 43 of a hat-like cross-sectional shape which is fixed by welding to a lower surface of the panel material 41 are provided on an inner side in the vehicle width direction (the right side in FIG. 11) of the floor panel side portion 55B. The panel material 41 and the reinforcement material 43 extend along the vehicle body front-rear direction.

A floor panel central portion 56B is formed on the inner side in the vehicle width direction of the panel material 41 and the reinforcement material 43. The floor panel central portion 56B is formed from a resin-containing material as with the floor panel side portion 55B. As shown in FIG. 10, a center tunnel 45 made of a metal as with the side sill inner member 25B is formed on a further inner side in the vehicle width direction of the floor panel central portion 56B.

The center tunnel 45 is located at the center in the vehicle width direction and extends in the vehicle body front-rear direction. Another panel material 41 and another reinforcement material 43 are also formed in bilaterally symmetrical shapes on the right side in the vehicle width direction about the center tunnel 45 as the center. The floor panel 5 provided with the floor panel side portion 55B and the floor panel central portion 56B has a bilaterally symmetrical shape about the center tunnel 45 as the center.

The molds include a lower mold 47, an upper mold 49, and a slide mold 51. The upper mold 49 descends from a position shown in FIG. 11 toward the lower mold 47. The slide mold 51 moves in a rightward direction from a position shown in FIG. 11 toward the lower mold 47. The molds shown in FIG. 11 have substantially laterally symmetrical shapes about the center tunnel 45 as the center, and illustration of the right side in the vehicle width direction thereof inclusive of the center tunnel 45 is omitted.

Here, in addition to the floor panel side portion 55B and the floor panel central portion 56B included in the floor panel 5, resin panel portions 11a and 11b that form the dash panel 11 are also integrally molded from the resin-containing material as shown in FIG. 10. Front panel materials 53 and 57 each made of a metal are provided between the set of the resin panel portions 11a and 11b and the set of the floor panel side portion 55B and the floor panel central portion 56B. Two sides in the vehicle width direction of the front panel material 53 are joined by welding to the side sill 15 and to the set of the panel material 41 and the reinforcement material 43, respectively. Two sides in the vehicle width direction of the front panel material 57 are joined by welding to the set of the panel material 41 and the reinforcement material 43 and to the center tunnel 45, respectively.

As shown in FIG. 11, the lower mold 47 includes a cutout portion 47a at a corner portion corresponding to an outer side end in the vehicle width direction. The cutout portion 47a includes a bottom surface 47a1 and an outer side surface 47a2. The side sill inner member 25B is disposed at the cutout portion 47a. In this case, the lower wall 25c of the side sill inner member 25B is brought into contact with the bottom surface 47a1 and the side wall 25a thereof is brought into contact with the outer side surface 47a2, respectively.

The lower mold 47 is provided with a recess 47c which is located at a position corresponding to an inner side in the vehicle width direction of the cutout portion 47a and recessed downward from an upper end surface 47b. The reinforcement material 43 is disposed and housed in the recess 47c. The panel material 41 is fixed by welding to the reinforcement material 43 in advance. The reinforcement material 43 includes a bottom portion wall 43a, right and left side portion walls 43b, and flanges 43c that project toward right and left sides from upper ends of the side portion walls 43b. The panel material 41 is fixed by welding onto the flanges 43c.

The recess 47c includes a bottom surface 47c1 and right and left side surfaces 47c2, and is provided with projections 47d that project upward from upper ends of the right and left side surfaces 47c2. Lower surfaces on the side portion wall 43b side of the flanges 43c come into contact with upper ends of the projections 47d in the state where the bottom portion wall 43a of the reinforcement material 43 is in contact with the bottom surface 47c1 of the recess 47c. In this instance, a gap 48 is formed between a lower surface on a tip side of each flange 43c and the upper end surface 47b of the lower mold 47. The resin-containing material that forms part of the floor panel side portion 55B and the floor panel central portion 56B at the time of molding enters the right and left gaps 48, respectively.

The upper mold 49 includes a lower end surface 49a opposed to the upper end surface 47b of the lower mold 47, an inclined side surface 49b that rises from a side edge at a region corresponding to an outer side in the vehicle width direction of the lower end surface 49a, and a rim portion lower end surface 49c that extends from an upper end of the inclined side surface 49b toward a side corresponding to the outer side in the vehicle width direction. The inclined side surface 49b is inclined in such a way as to become parallel to the inclined wall 25f of the side sill inner member 25B. Although it is not illustrated, the upper mold 49 includes a front projection and a rear projection which project downward from respective ends corresponding to two ends in the vehicle body front-rear direction. The front projection and the rear projection come into contact with the upper end surface 47b of the lower mold 47 at the time of mold closing. Thus, a molding space is defined by the lower mold 47, the upper mold 49, and the right and left slide molds 51 at the time of mold closing.

Each slide mold 51 is inserted into a space surrounded by the side wall 25a, the upper wall 25b, the lower wall 25c, and the inclined wall 25f of the side sill inner member 25B. The slide mold 51 includes wall portions 51a, 51b, 51c, and 51f that come into contact with the respective walls 25a, 25b, 25c, and 25f mentioned above.

As shown in FIG. 11, the side sill inner member 25B is disposed at the cutout portion 47a of the lower mold 47 and the reinforcement material 43 integrated with the panel material 41 is disposed at the recess 47c of the lower mold 47. Moreover, multiple resin pieces 39 are disposed on the upper end surface 47b of the lower mold 47 at portions to mold the floor panel side portion 55B, the floor panel central portion 56B, and the like with the resin.

Figure 12:
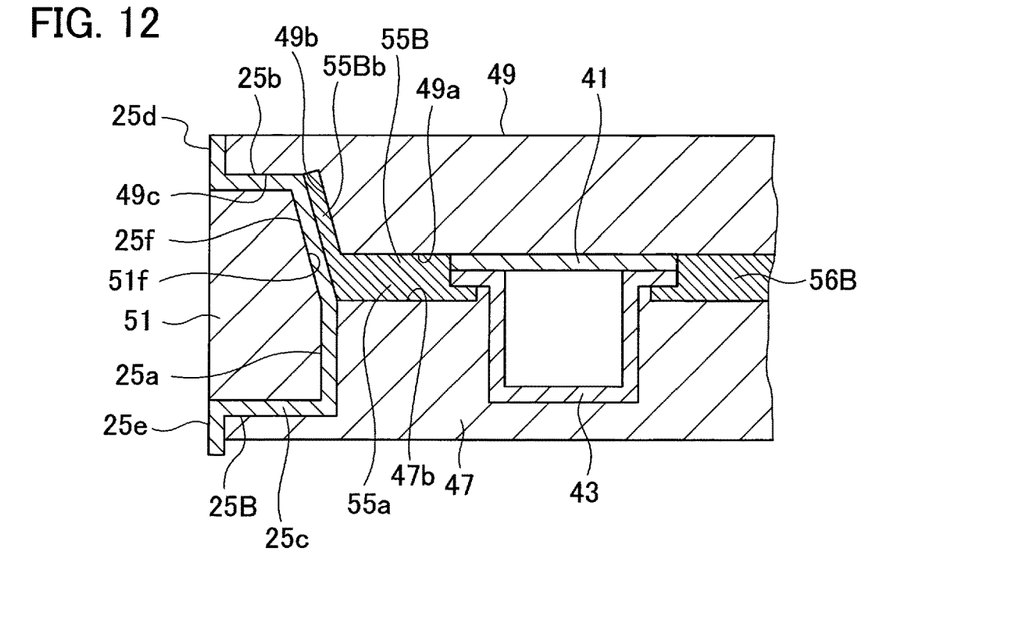
FIG. 12 is a cross-sectional view showing a state after the molding in contrast to FIG. 11.

After the metal members including the side sill inner member 25B, the panel material 41, the reinforcement material 43, and the like are disposed in the lower mold 47, the slide mold 51 is inserted and disposed inside the side sill inner member 25B by causing the slide mold 51 to slide as shown in FIG. 12. In this state, pressure molding is conducted by causing the upper mold 49 to descend as shown in FIG. 12. At the time of pressure molding, the lower end surface 49a of the upper mold 49 comes into contact with the panel material 41, the front panel materials 53 and 57, and the center tunnel 45, while the rim portion lower end surface 49c comes into contact with the upper wall 25b of the side sill inner member 25B. Moreover, the front projection and the rear projection, which are not illustrated, of the upper mold 49 come into contact with the upper end surface 47b of the lower mold 47.

Accordingly, the outer side in the vehicle width direction of the floor panel side portion 55B is joined to and molded integrally with the side sill inner member 25B while the inner side in the vehicle width direction thereof is joined to and molded integrally with the panel material 41 and the reinforcement material 43. The outer side in the vehicle width direction of the floor panel central portion 56B is joined to and molded integrally with the panel material 41 and the reinforcement material 43 while the inner side in the vehicle width direction thereof is joined to and molded integrally with the center tunnel 45.

The ninth embodiment includes a part disposing step of disposing the side sill inner member 25B made of a metal into the molds, and a resin supplying step of supplying the resin pieces 39 into the molds. Moreover, this embodiment also includes a pressure molding step of molding the resin pieces 39 in the molds into the floor panel side portion 55B provided with the flange portion 55Bb by applying the pressure to the resin pieces 39, and joining the flange portion 55Bb to the side sill inner member 25B. When the floor panel side portion 55B is molded in the pressure molding step, the flange portion 55Bb is formed to be bent toward the upper side from the bottom wall 55a at the end in the vehicle width direction thereof.

In this case, the molding of the floor panel side portion 55B and the joining of the floor panel side portion 55B to the side sill inner member 25B, the panel material 41, and the reinforcement material 43 can be carried out at the same time. This makes it possible to simplify the manufacturing process and to achieve cost reduction. In this instance, the floor panel side portion 55B is joined in such a way as to cause the flange portion 55Bb to butt the inclined wall 25f. As a consequence, it is possible to secure a larger junction area between the floor panel side portion 55B and the side sill inner member 25B by the flange portion 55Bb, whereby adhesion is increased and the junction strength is improved.

When the flange portion 55Bb joined to the side sill inner member 25B is used as part of the side sill 15, the thickness in the vehicle width direction of the side sill 15 becomes thicker in an amount equivalent to the additional plate thickness of the flange portion 55Bb, whereby the cross-sectional shape of the side sill 15 becomes larger. Thus, it is possible to improve rigidity of the side sill 15 corresponding to a region around a junction of the side sill inner member 25B and the floor panel side portion 55B. In particular, the larger thickness in the vehicle width direction of the side sill 15 increases rigidity against a lateral collision load.

In addition, the molding of the floor panel central portion 56B and the joining of the floor panel central portion 56B to the panel material 41, the reinforcement material 43, and the center tunnel 45 can be carried out at the same time. This makes it possible to simplify the manufacturing process and to achieve cost reduction.

In the example shown in FIGS. 11 and 12, the flange portion 55Bb of the floor panel side portion 55B is joined to the inclined wall 25f of the side sill inner member 25B. Specifically, the side sill inner member 25B of this embodiment includes the protruding portion 33 that projects from the rim portion 31 toward the floor panel side portion 55B. The peak portion 25a of the protruding portion 33 to be joined to the flange portion 55Bb, which is located away from the rim portion 31 to the floor panel side portion 55B side, includes the inclined wall 25f that is inclined relative to the vertical direction. In the pressure molding step, the pressure in the up-down direction is applied to the inclined wall 25f.

In this case, when the pressure molding is carried out as shown in FIG. 12, it is possible to apply the pressure between the inclined side surface 49b of the upper mold 49 and the inclined wall portion 51f of the slide mold 51 in such a direction that presses the flange portion 55Bb against the inclined wall 25f of the side sill inner member 25B. In this way, the adhesion between the flange portion 55Bb and the side sill inner member 25B is improved. Here, in order to reliably apply the pressure, it is desirable to set an inclination angle of the inclined wall 25f equal to or above 10° relative to the vertical direction.

Tenth Embodiment

Figure 13:
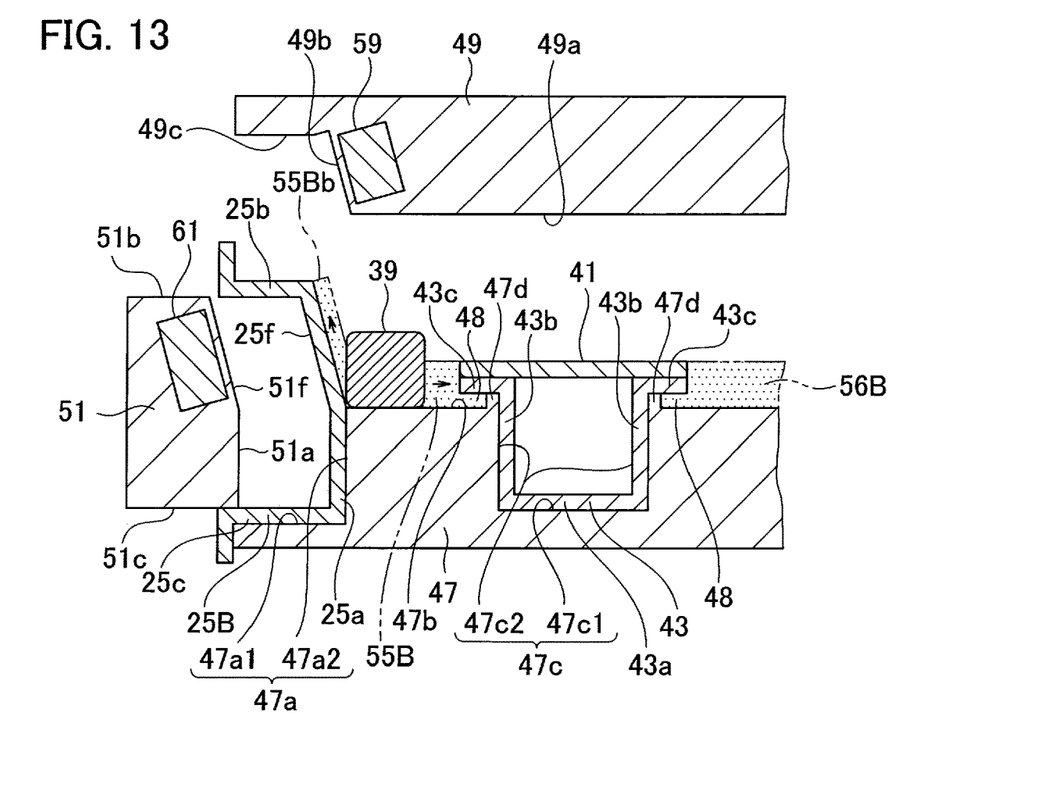
FIG. 13 is a cross-sectional view according to a tenth embodiment, in which heaters are attached to an upper mold and to a slide mold in contrast to FIG. 11, respectively.

In FIG. 13 heaters 59 and 61 are attached to the upper mold 49 and the slide mold 51, respectively, in contrast to FIG. 11. As for the heaters 59 and 61, heaters for heating molds, for example, are buried into the upper mold 49 and the slide mold 51. The heaters 59 and 61 are provided at positions corresponding to the junction of the flange portion 55Bb of the floor panel side portion 55B and the inclined wall 25f of the side sill inner member 25B. To be more precise, the heater 59 is disposed at a position corresponding to the inclined side surface 49b of the upper mold 49 while the heater 61 is located at a position corresponding to the wall portion 51f of the slide mold 51. At the time of pressure molding, the upper mold 49 and the slide mold 51 are heated by energizing the heaters 59 and 61.

The tenth embodiment includes a mold heating step of heating the portions of the upper mold 49 and the slide mold 51 at the positions corresponding to the junction of the side sill inner member 25B and the floor panel side portion 55B by using the heaters 59 and 61. In this case, the junction of the side sill inner member 25B and the floor panel side portion 55B is heated at the time of mold closing when the pressure molding takes place by causing the upper mold 49 to descend. Thus, fluidity of the resin at the region corresponding to the junction of the side sill inner member 25B and the floor panel side portion 55B is increased and the adhesion between the side sill inner member 25B and the floor panel side portion 55B is improved at the junction.

Here, the timing to energize the heaters 59 and 61 is set in a step preceding the pressure molding step, or as a step after the part disposing step of disposing the side sill inner member 25B, the panel material 41, and the reinforcement material 43 into the lower mold 47, for example. By heating the upper mold 49 and the slide mold 51 in advance prior to application of the pressure, the fluidity of the resin is further increased.

Eleventh Embodiment

Figure 14:
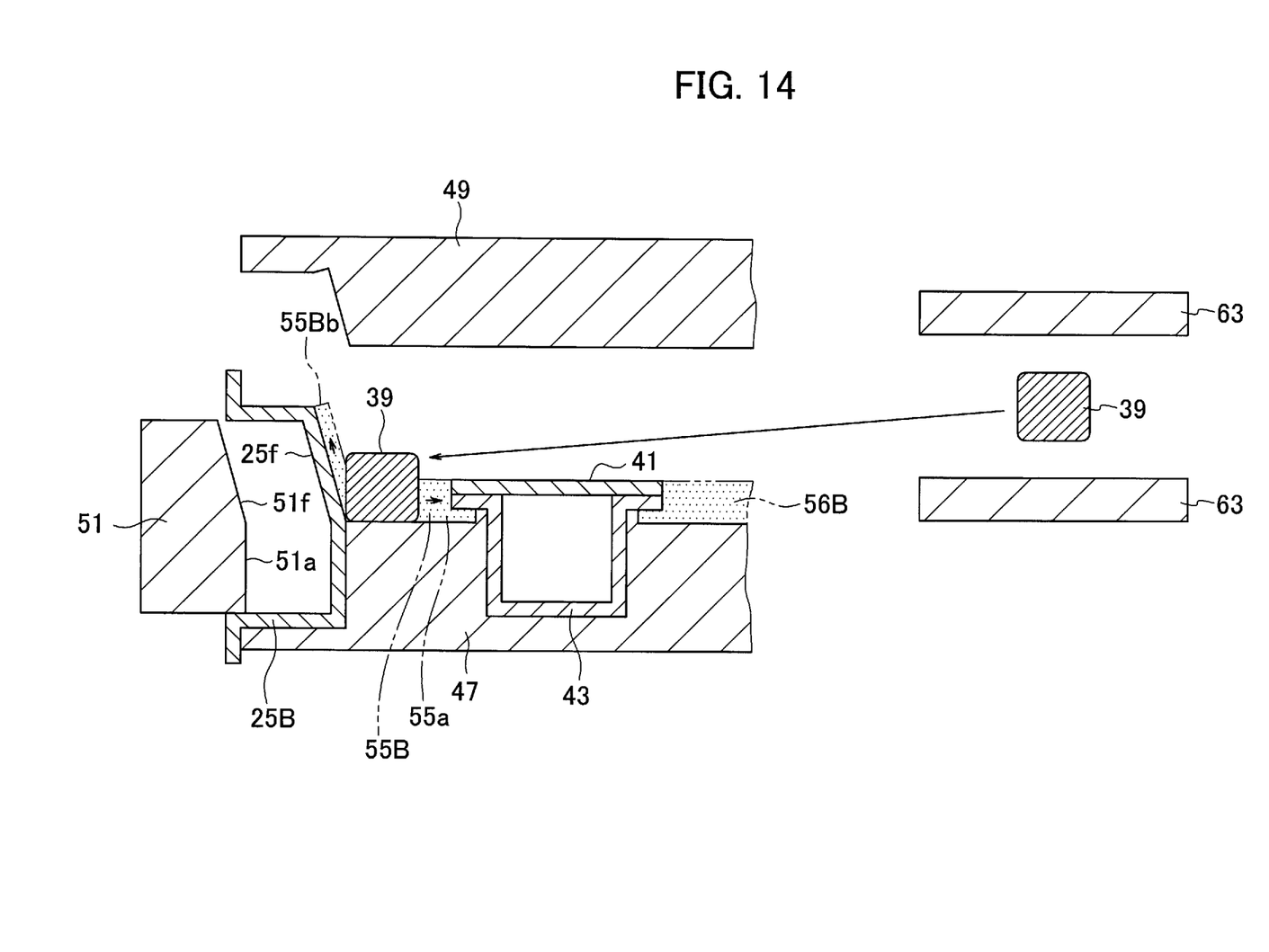
FIG. 14 is a cross-sectional according to an eleventh embodiment configured to preheat a resin with a heating device instead of providing the heaters of FIG. 13.

In FIG. 14, each resin piece 39 in a solid state is preheated with a heating device 63 such as a heater instead of providing the heaters 59 and 61 of FIG. 13. The resin pieces 39 heated with the heating device 63 are supplied onto the upper end surface 47b of the lower mold 47 at positions where the resin molding takes place, such as positions to form the floor panel side portion 55B and the floor panel central portion 56B. In other words, the eleventh embodiment includes a resin heating step of heating the resin pieces 39 before being supplied into the molds. Thus, the fluidity of the resin at the region corresponding to the junction of the side sill inner member 25B and the floor panel side portion 55B is increased and the adhesion between the side sill inner member 25B and the floor panel side portion 55B is improved at the junction.

Twelfth Embodiment

Figure 15:
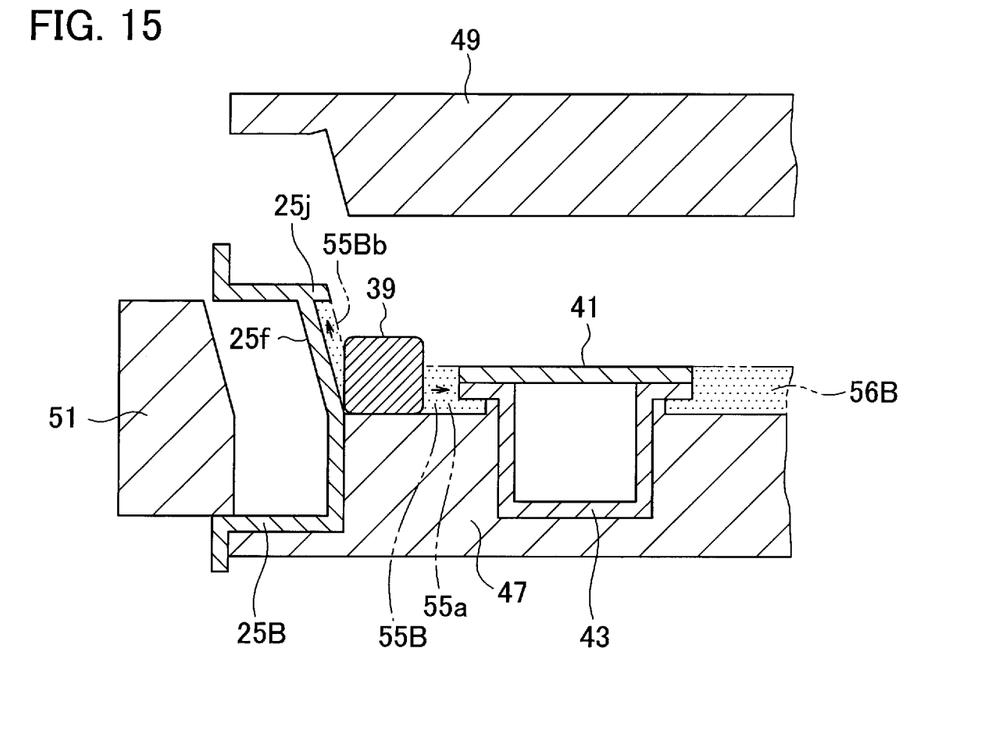
FIG. 15 is a cross-sectional view according to a twelfth embodiment configured to provide an upper part of an inclined wall of a side sill inner member with a protrusion that projects to an inner side in the vehicle width direction in contrast to FIG. 11.

In FIG. 15, a projection 25j that projects toward the inner side in the vehicle width direction is formed at an upper part of the inclined wall 25f of the side sill inner member 25B in contrast to FIG. 11. The projection 25j may be provided as a separate member from the side sill inner member 25B and fixed by welding or the like, or may be formed integrally with the side sill inner member 25B by press molding.

An amount of supply of the resin pieces 39 in the twelfth embodiment is set such that a thickness in the vehicle width direction of the flange portion 55Bb of the floor panel side portion 55B becomes substantially equal to a height of the projection 25j from the inclined wall 25f at a position to mold the flange portion 55Bb.

According to the twelfth embodiment, the side sill inner member 25B includes the projection 25j being located at the position corresponding to a tip of the flange portion 55Bb and projecting to the floor panel side portion 55B side. In the resin supplying step, the resin pieces 39 in such an amount that the thickness in the vehicle width direction of the flange portion 55Bb becomes equal to a projecting height of the projection 25j to the floor panel side portion 55B side is supplied into the molds. In this case, provision of the projection 25j makes it possible to inhibit the resin from flowing out of a resin molding space at the time of pressure molding. By setting the thickness of the flange portion 55Bb equal to the projecting height of the projection 25j, it is possible to efficiently apply a force to bring the resin into close contact with the side sill inner member 25B at the time of pressure molding.

Thirteenth Embodiment

Figure 16:
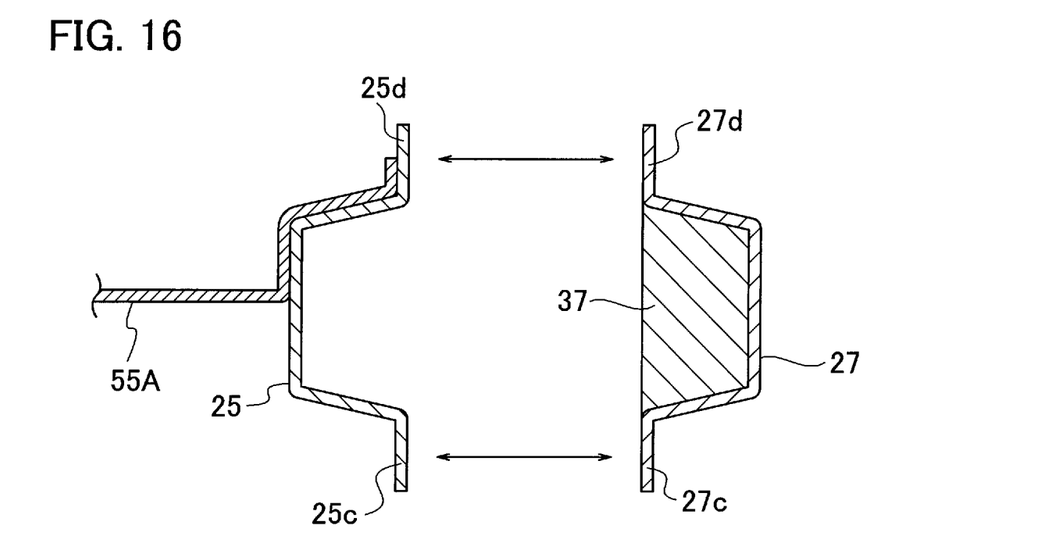
FIG. 16 is a cross-sectional view according to a thirteenth embodiment configured to join a side sill outer member to the side sill inner member.

As shown in FIG. 16, in a thirteenth embodiment, the floor panel side portion 55A is molded integrally with the side sill inner member 25 as with the embodiment shown in FIG. 9, while the ribs 37 are molded integrally with the side sill outer member 27 as with the embodiment shown in FIG. 9. Thereafter, the side sill inner member 25 and the side sill outer member 27 are integrated together by joining the upper flanges 25d and 27d to each other and the lower flanges 25e and 27e to each other by welding, respectively. In this case, the floor panel side portion 55A is molded integrally with the side sill inner member 25 before the side sill inner member 25 is joined by welding to the side sill outer member 27.

The thirteenth embodiment includes a side sill part joining step of joining the side sill outer member 27 made of a metal to the side sill inner member 25 on a different side in the vehicle width direction from the floor panel side portion 55A. The closed cross-sectional portion 29 is formed between the side sill inner member 25 and the side sill outer member 27. Thus, the side sill 15 secures rigidity against a lateral collision load in particular. In this instance, the rigidity is further improved since the ribs 37 are molded integrally with the side sill outer member 27.

In the side sill part joining step of the thirteenth embodiment, the side sill inner member 25 in the state of being joined to the floor panel side portion 55A is joined by welding to the side sill outer member 27 joined to the ribs 37. In this case, it is possible to conduct molding work accurately and efficiently by molding the floor panel side portion 55A integrally with the side sill inner member 25 before the side sill inner member 25 is joined by welding to the side sill outer member 27. When the floor panel side portion 55A is molded integrally with the side sill inner member 25 in the state where the side sill outer member 27 is joined by welding thereto, it is necessary to dispose the side sill outer member 27 integrated with the side sill inner member 25 in the mold. This configuration leads to an increase in size of each mold and causes a deterioration in precision of a molded product.

While the embodiments of the present invention have been discussed above, these embodiments are mere examples described in order to facilitate the understanding of the present invention, and the present invention is not limited only to the embodiments. The technical scope of the present invention is not limited only to the specific technical matters disclosed in the above-described embodiments, and various modifications, alterations, alternative techniques, and the like which are easily derivable therefrom are also encompassed by the present invention.

For example, in the above-described embodiments, the resin pieces 39 in the solid state are first supplied into the molds and are then subjected to pressure molding in the case of molding the floor panel side portion 55 integrally with the side sill inner member 25. Instead, a molten resin may be supplied into the molds by injection and then subjected to pressure molding.

REFERENCE SIGNS LIST 25, 25B, 25E side sill inner member (side sill part)
25a side wall (peak portion) of side sill inner member
25a1 dent (indented structure)
25b upper wall (upper surface portion, intermediate portion) of side sill inner member
25c lower wall (lower surface portion, intermediate portion) of side sill inner member
25i, 25j projection
27 side sill outer member (second side sill part)
29 closed cross-sectional portion
31 rim portion of side sill inner member
33 protruding portion of side sill inner member
35, 36 fiber-reinforcement material
37 rib (resin member)
39 resin piece
55, 55A, 55B floor panel side portion (floor part)
55b, 55Ab, 55Bb, flange portion

The invention claimed is:

1. A vehicle body structure comprising:
a resin floor part including a bottom wall and a flange portion bent toward an upper side or a lower side at an end in a vehicle width direction of the bottom wall; and
a metal side sill part joined to the resin floor part at the flange portion, wherein
the side sill part includes a rim portion, a peak portion, and an intermediate portion linking the rim portion to the peak portion,
the peak portion and the intermediate portion form a protruding portion projecting from the rim portion toward the floor part,
the flange portion of the resin floor part is joined to the peak portion of the protruding portion,
the peak portion to be joined to the flange portion includes an inclined wall that is inclined relative to a vertical direction, and
the flange portion and a bent portion formed between the bottom wall and the flange portion are in close contacted directly with the inclined wall and joined to the inclined wall by an integral molding of the floor part and the side sill part.

2. The vehicle body structure according to claim 1, wherein
the intermediate portion includes an upper surface portion located at an upper part of a vehicle body and a lower surface portion located at a lower part of the vehicle body, and
the flange portion is formed to be bent toward the upper side and joined to the upper surface portion.

3. The vehicle body structure according to claim 2, wherein
the side sill part includes a projection projecting from the rim portion toward the floor part side at a position above the upper surface portion, the projection being smaller than the protruding portion, and
an end in the vehicle width direction of the flange portion is located closer to the protruding portion than the projection is.

4. The vehicle body structure according to claim 1, wherein
an indented structure being smaller than the protruding portion is formed on a surface of the side sill part to be joined to the floor part.

5. The vehicle body structure according to claim 1, wherein
a plate thickness of a portion of the floor part to be joined to a corner portion of the side sill part is greater than a plate thickness of a portion of the floor part to be joined to a flat portion of the side sill part.

6. The vehicle body structure according to claim 1, wherein
the resin floor part contains fibers oriented to a constant direction.

7. The vehicle body structure according to claim 1, further comprising:
a second side sill part joined to a different side in the vehicle width direction from the floor part of the side sill part, and configured to form a closed cross-sectional portion in conjunction with the protruding portion of the side sill part; and
a resin member disposed at a region of the second side sill part opposed to the protruding portion.

8. The vehicle body structure according to claim 1, wherein
an upper end of the inclined wall and an end on the floor part side of the intermediate portion are bent at a side sill bent portion, and
an upper end of the flange portion is located at the side sill bent portion.

9. The vehicle body structure according to claim 1, wherein
the bent portion and the flange portion of the floor part are joined to the entire inclined wall in an inclined direction.

10. The vehicle body structure according to claim 1, wherein
the bent portion and the flange portion are in close contacted directly with the inclined wall and joined to the inclined wall in a state that a pressure applied during the integral molding is applied to the inclined wall.

11. The vehicle body structure according to claim 1, wherein
a recess is formed in the inclined wall, and a resin of the integral molding enters the recess.

* * * * *